United States Patent
Ubben (10) Patent No.: US 12,044,213 B2
(45) Date of Patent: Jul. 23, 2024

(54) SYSTEM AND METHOD FOR CONTROLLING WIND FARM OPERATION DURING A WEAK GRID CONDITION

(71) Applicant: General Electric Renovables Espana, S.L., Barcelona (ES)

(72) Inventor: Enno Ubben, Steinfurt (DE)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/682,189

(22) Filed: Feb. 28, 2022

(65) Prior Publication Data

US 2023/0272773 A1    Aug. 31, 2023

(51) Int. Cl.
   *F03D 7/02*    (2006.01)
   *F03D 7/04*    (2006.01)

(52) U.S. Cl.
   CPC .......... *F03D 7/0284* (2013.01); *F03D 7/048* (2013.01); *F05B 2270/1033* (2013.01); *F05B 2270/335* (2013.01); *F05B 2270/337* (2013.01)

(58) Field of Classification Search
   CPC ................. F03D 7/0284; F03D 7/048; F05B 2270/1033; F05B 2270/335; F05B 2270/337
   See application file for complete search history.

(56) References Cited

U.S. PATENT DOCUMENTS

| | | | | |
|---|---|---|---|---|
| 7,649,282 B2 * | 1/2010 | Jurkat | ............. | F03D 7/0284 307/85 |
| 7,933,744 B2 * | 4/2011 | Jammu | ............. | G05B 23/0229 702/185 |
| 10,352,301 B2 * | 7/2019 | Gupta | ............. | H02J 3/16 |
| 2014/0159367 A1 * | 6/2014 | Yin | ............. | F03D 7/0284 290/44 |
| 2017/0130699 A1 * | 5/2017 | Achilles | ............. | G05B 13/0205 |

FOREIGN PATENT DOCUMENTS

| | | | |
|---|---|---|---|
| EP | 2876768 A1 | 5/2015 | |
| EP | 3076012 A1 * | 10/2016 | ............. F03D 7/026 |

OTHER PUBLICATIONS

EP Search Report for EP application No. 23157616.0, Jul. 12, 2023, 5 pages.

* cited by examiner

*Primary Examiner* — Juan G Flores
*Assistant Examiner* — Eric A Lange
(74) *Attorney, Agent, or Firm* — Dority & Manning, P.A.

(57) ABSTRACT

A method for controlling wind farm operation during a weak grid condition includes determining when a threshold number of the plurality of wind turbines have tripped based on the received one or more inputs. Furthermore, the method includes determining a sampled power output of the wind farm based on received sensor data after it is determined that the threshold number of the plurality of wind turbines have tripped. Additionally, the method includes controlling the operation of the one or more wind turbines of the plurality of wind turbines that have not tripped after it is determined that the threshold number of the plurality of wind turbines have tripped such that the power output of the one or more wind turbines of the plurality of wind turbines that have not tripped is less than or equal to the sampled power output.

20 Claims, 5 Drawing Sheets

SYSTEM AND METHOD FOR CONTROLLING WIND FARM OPERATION DURING A WEAK GRID CONDITION

FIELD

The present disclosure generally relates to wind turbines. More particularly, the present disclosure relates systems and methods for controlling the operation of a wind farm having a plurality of wind turbines, such as during a weak grid condition.

BACKGROUND

Wind power is considered one of the cleanest, most environmentally friendly energy sources presently available, and wind turbines have gained increased attention in this regard. A modern wind turbine typically includes a tower, a nacelle mounted on the tower, a generator positioned in the nacelle, and one or more rotor blades. The one or more rotor blades convert kinetic energy of wind into mechanical energy using known airfoil principles. A drivetrain transmits the mechanical energy from the rotor blades to the generator. The generator then converts the mechanical energy to electrical energy that may be supplied to a utility grid.

A wind farm is a group of wind turbines located at a particular geographic location that supply electric power to a power grid. In certain instances, a weak grid condition may occur in which there is a high impedance to supplying power to the grid, which limits the amount of power that can be supplied to the grid. A weak grid condition may, in turn, cause unacceptable voltage and/or frequency fluctuations in the grid. For example, a weak grid condition may result from a large distance between the wind farm and the grid, a high load on the grid, small or old wind turbines, and/or the like.

To prevent such voltage and/or frequency fluctuations, it may be necessary to disconnect one or more of the wind turbines in the wind farm from the grid. In this respect, systems and methods for controlling the operation of a wind farm during a weak grid condition have been developed. While such systems work well, further improvements are needed.

BRIEF DESCRIPTION

Aspects and advantages of the technology will be set forth in part in the following description, or may be obvious from the description, or may be learned through practice of the technology.

In one aspect, the present subject matter is directed to a method for controlling wind farm operation during a weak grid condition. The method includes receiving, with a computing system, one or more inputs indicating that one or more wind turbines of a plurality of wind turbines forming a wind farm have tripped. Furthermore, the method includes determining, with the computing system, when a threshold number of the plurality of wind turbines have tripped based on the received one or more inputs. Additionally, the method includes receiving, with the computing system, sensor data indicative of a sampled power output of the wind farm. Moreover, the method includes determining, with the computing system, the sampled power output of the wind farm based on the received sensor data after it is determined that the threshold number of the plurality of wind turbines have tripped. In addition, the method includes controlling, with the computing system, an operation of the one or more wind turbines of the plurality of wind turbines that have not tripped after it is determined that the threshold number of the plurality of wind turbines have tripped such that the power output of the one or more wind turbines of the plurality of wind turbines that have not tripped is less than or equal to the sampled power output.

In another aspect, the present subject matter is directed to a system for controlling wind farm operation during a weak grid condition. The system includes a plurality of wind turbines forming a wind farm, one or more sensors configured to capture data indicative of a power output of the wind farm, and a computing system communicatively coupled to the one or more sensors. The computing system is configured to receive one or more inputs indicating that one or more wind turbines of the plurality of wind turbines have tripped. Furthermore, the computing system is configured to determine when a threshold number of the plurality of wind turbines have tripped based on the received one or more inputs. Additionally, the computing system is configured to determine a sampled power output of the wind farm based on the data captured by the one or more sensors after it is determined that the threshold number of the plurality of wind turbines have tripped. Moreover, the computing system is configured to control the operation of the one or more wind turbines of the plurality of wind turbines that have not tripped after it is determined that the threshold number of the plurality of wind turbines have tripped such that the power output of the one or more wind turbines of the plurality of wind turbines that have not tripped is less than or equal to the sampled power output.

In a further aspect, the present subject matter is directed to a wind farm. The wind farm includes a plurality of wind turbines, with each wind turbine of the plurality of wind turbines having a tower, a nacelle mounted atop the tower, and a rotor having rotatable hub with at least one rotor blade mounted thereto. In addition, the wind farm includes one or more sensors configured to capture data indicative of a power output of the wind farm and a computing system communicatively coupled to the one or more sensors. The computing system, in turn, includes a farm-level controller and a plurality of turbine controllers, with each turbine controller of the plurality of turbine controllers being installed within one wind turbine of the plurality of wind turbines. In this respect, the computing system is configured to receive one or more inputs indicating that one or more wind turbines of the plurality of wind turbines have tripped. Furthermore, the computing system is configured to determine when a threshold number of the plurality of wind turbines have tripped based on the received one or more inputs. Additionally, the computing system is configured to determine a sampled power output of the wind farm based on the data captured by the one or more sensors after it is determined that the threshold number of the plurality of wind turbines have tripped. Moreover, the computing system is configured to control the operation of the one or more wind turbines of the plurality of wind turbines that have not tripped after it is determined that the threshold number of the plurality of wind turbines have tripped such that the power output of the one or more wind turbines of the plurality of wind turbines that have not tripped is less than or equal to the sampled power output.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

In general, the present subject matter is directed to systems and methods for controlling wind farm operation during a weak grid condition. As will be described below, a weak grid condition is present when the grid has a high impedance, is poorly controlled, or lacks inertia, thereby resulting in unstable grid voltage, unstable frequency, and/or outages. For example, a weak grid condition can be caused by a large distance between the wind farm and the grid (without compensation), a high load on the grid, small or old wind turbines, and/or the like.

In several embodiments, the disclosed system and method may generally limit the amount of power that the wind farm can generate when a weak grid condition occurs. Specifically, a computing system receives one or more inputs indicating that one or more wind turbines of a plurality of wind turbines forming a wind farm have tripped or otherwise been disconnected from the grid. For example, in one embodiment, a wind turbine may automatically be tripped when a phase jump is detected (e.g., within its power converter). A phase jump may, in turn, be indicative of the occurrence of weak grid condition. Furthermore, the computing system determines when a threshold number of the plurality of wind turbines have tripped based on the received input(s). When the threshold number of wind turbines have tripped, the computing system determines a sampled power output of the wind farm (i.e., the power output of the wind turbines that have not tripped). Thereafter, the computing system controls the operation on the wind turbines that have not tripped such that the power output of the wind farm is at or below sampled power output.

The disclosed system and method improve of the operation of a wind farm during weak grid conditions. More specifically, as described above, the high impedance associated with a weak grid condition limits the amount of power that can be supplied to grid. In this respect, by maintaining the power output of the non-tripped wind turbines at a reduced level (i.e., the sampled power output) after a threshold number of the wind turbines have tripped, the weak grid condition can be at least temporarily eliminated. Moreover, when the weak grid condition disappears, the tripped wind turbines are not automatically reconnected to the grid as the operation of one or more of the tripped wind may cause the weak grid condition to reappear. Instead, the tripped wind turbines are reconnected to the grid only after receipt of a manual override by an operator of the wind farm, such as when the operator believes that the underlying cause of the weak grid condition has disappeared.

Figure 1:
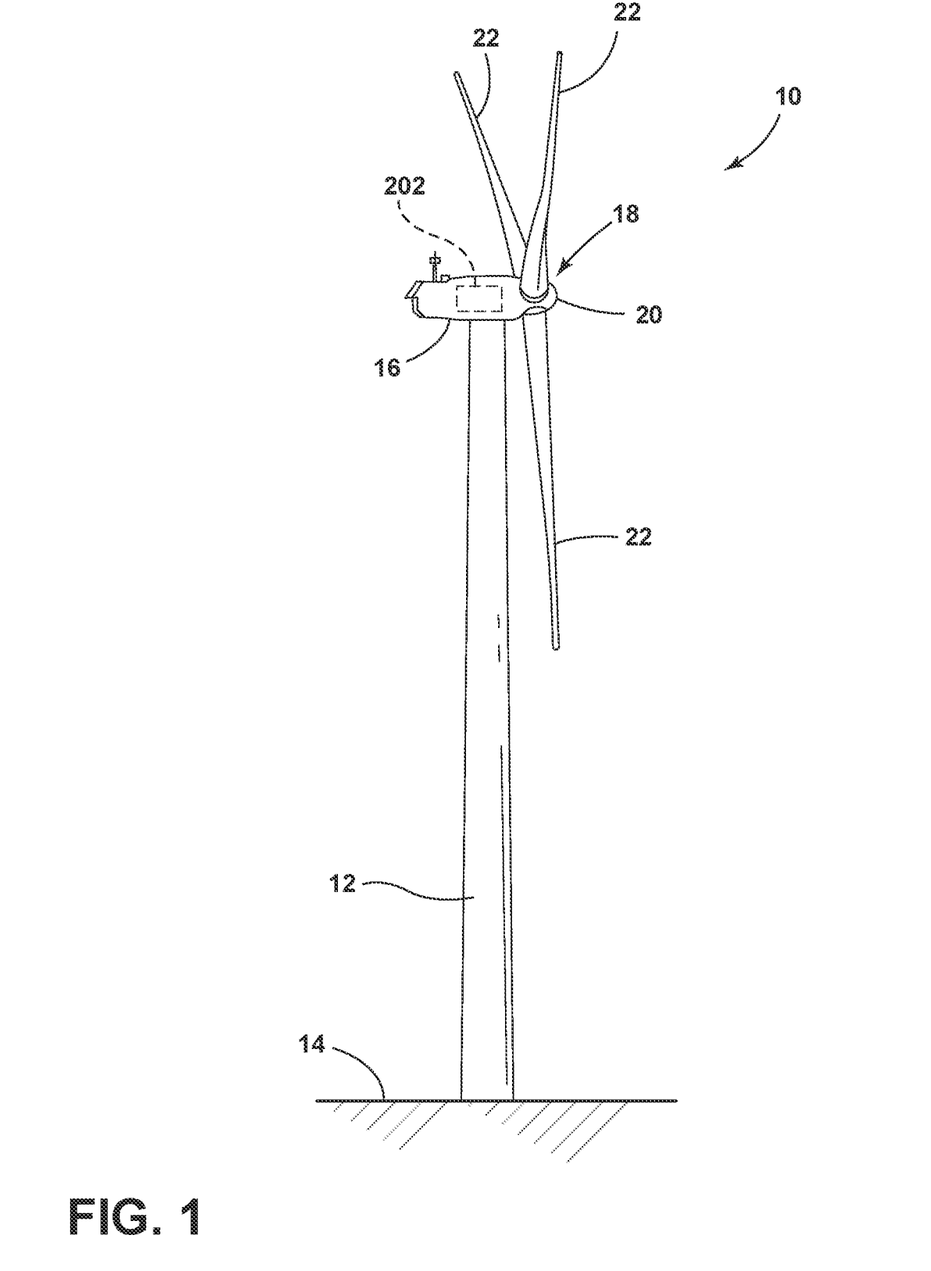
FIG. 1 is a side view of one embodiment of a wind turbine.

Referring now to the drawings, FIG. 1 is a side view of one embodiment of a wind turbine 10. As shown, the wind turbine 10 generally includes a tower 12 extending from a support surface 14, a nacelle 16 mounted atop the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. In alternative embodiments, however, the rotor 18 may include more or less than three rotor blades 22. Each rotor blade 22 may be spaced about the hub 20 to facilitate rotation of the rotor 18 for converting kinetic energy from the wind into usable rotational, mechanical energy.

The hub 20 may be rotatably coupled to an electric generator (not shown) positioned within the nacelle 16 to permit electrical energy to be produced. The generator may be rotationally coupled to the rotor 18 via a gearbox (not shown). Thus, the gearbox is configured to step up the inherently low rotational speed of the rotor for the generator to efficiently convert the rotational mechanical energy to electric energy. Alternatively, the generator may be coupled to the rotor 18 in a direct drive configuration.

Furthermore, the wind turbine 10 includes a turbine controller 202. As will be described below, the turbine controller 202 is a processor-based device configured to control the operation of the wind turbine 10, such as based on inputs and/or data received from another controller and/or a sensor(s). In the illustrated embodiment, the turbine controller 202 is positioned within the nacelle 16. However, in alternative embodiments, the turbine controller 202 may be positioned at any other suitable location within the wind turbine 10, such as within the tower 12.

Figure 2:
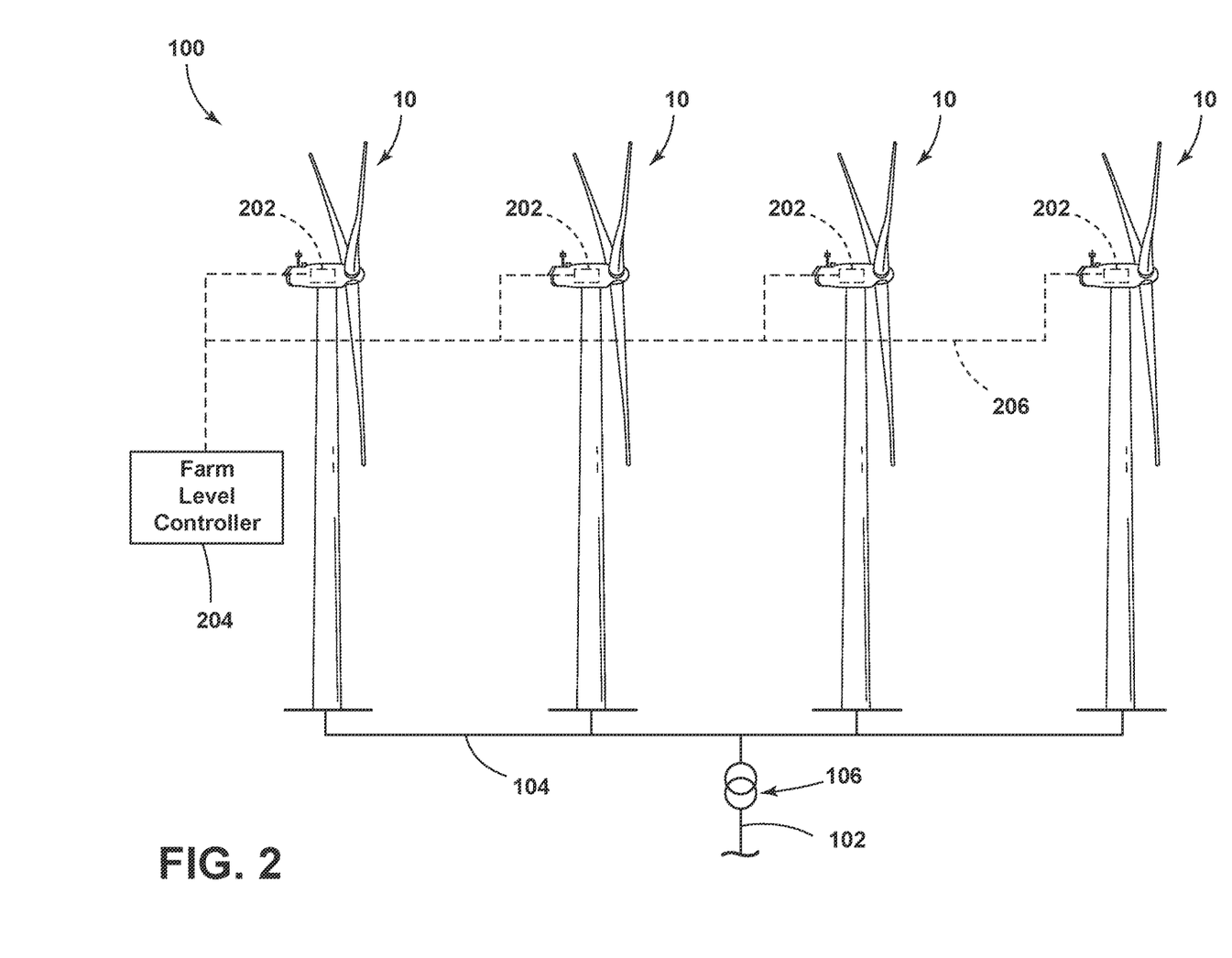
FIG. 2 is a diagrammatic view of one embodiment of a wind farm.

FIG. 2 is a diagrammatic view of one embodiment of a wind farm 100. In general, the wind farm 100 will be described in the context of the wind turbine 10 described above with reference to FIG. 1. However, the disclosed wind farm 100 may generally be utilized with wind turbines having any other suitable configuration.

A wind farm 100 generally is formed by a plurality of wind turbines 10 located at a particular geographic location. For the purposes of clarity, the wind farm 100 of FIG. 2 includes four wind turbines 10. However, in alternative embodiments, the wind farm 100 include any other suitable number of wind turbines 10, such as fifty or more wind turbines 10.

In general, the wind farm 100 supplies electric power to a power grid (e.g., as indicated by line 102). Specifically, in several embodiments, one or more transmission lines 104 may be electrically coupled between each wind turbine 10 (e.g., its generator) of the wind farm 100 and the grid 102. For example, in some embodiments, a transformer 106 may couple the transmission line(s) 104 to the grid 102. Thus, electric power generated by each of the wind turbines 10 may be supplied to the grid 102 by the transmission lines 104. As will be described below, the wind turbines 10 may be disconnected from the grid 102 on an individual basis. This is known the art as "tripping."

Additionally, the wind farm 100 includes a farm-level controller 204. As will be described below, the farm-level controller 204 is a processor-based device configured to control or otherwise coordinate the operation of the wind farm 100. As shown, the farm-level controller 204 is communicatively coupled to the turbine controller 202 of each wind turbine 10 forming the wind farm 100 via a communicative link 206. In this respect, various input, data, commands, and/or the like may be transmitted between the turbine controller 202 and the farm level controller 204, thereby facilitating control of the wind farm 100 on a wind turbine-by-wind turbine basis.

Figure 3:
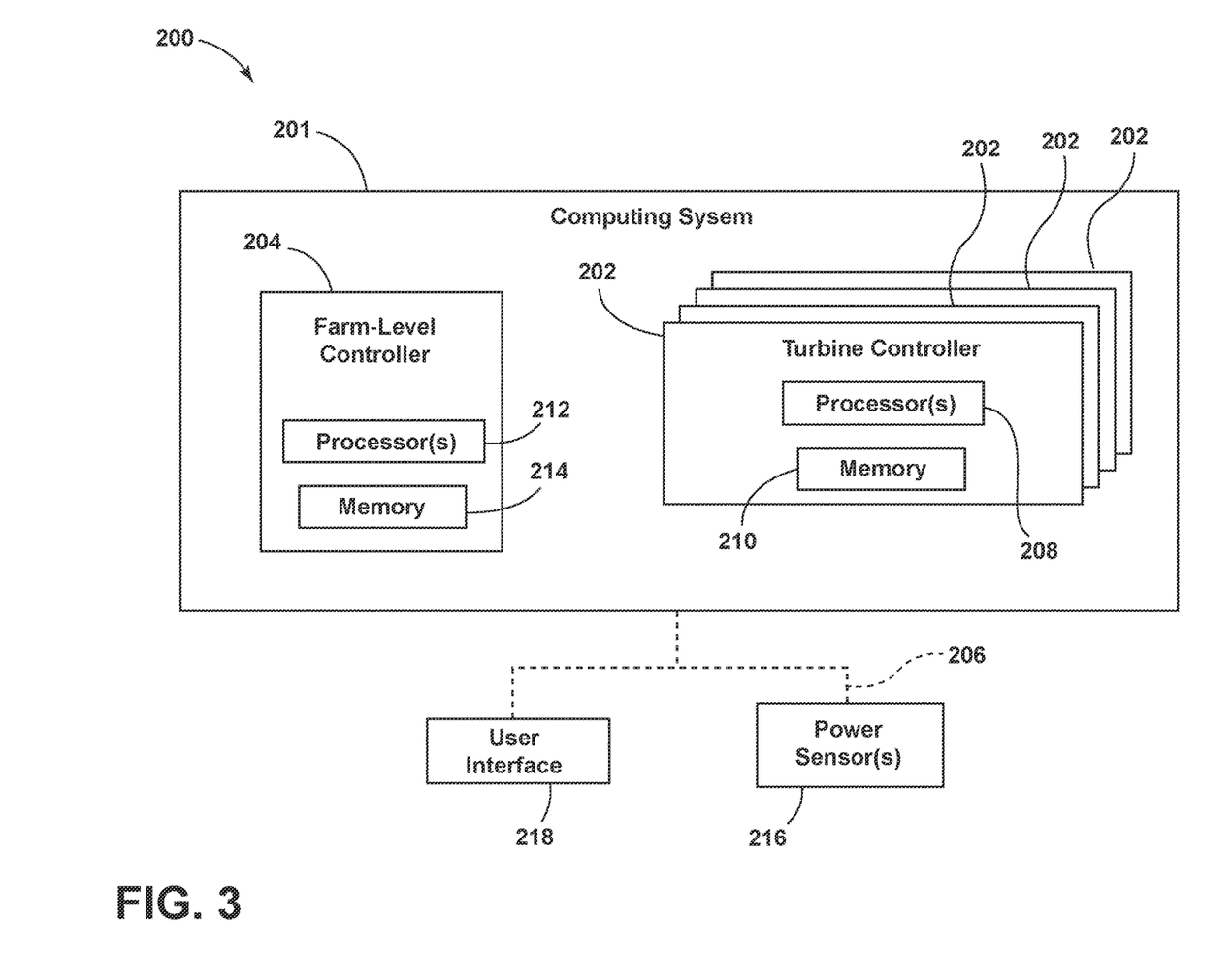
FIG. 3 is a schematic view of one embodiment of a computing system of a wind farm.

FIG. 3 is a schematic view of one embodiment of a system 200 for controlling wind farm operation during a weak grid condition. In general, the system 200 will be described herein with reference to the wind turbine 10 and the wind farm 100 described above with reference to FIGS. 1 and 2. However, the disclosed system 200 may generally be utilized with wind turbines having any other suitable configuration and/or wind farms having any other suitable configuration.

As shown, the system 200 includes a computing system 201 of the wind farm 100. As shown, the computing system 201 is formed from the turbine controllers 202 of the wind turbines 10 and the farm level controller 204. However, in alternative embodiments, the computing system 201 may include other processor-based devices in addition to or in lieu of the turbine controllers 202 and the farm-level controller 204.

In general, each turbine controller 202 may include any suitable processor-based device known in the art, such as a computing device or any suitable combination of computing devices. Thus, in several embodiments, each turbine controller 202 may include one or more processor(s) 208 and associated memory device(s) 210 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 210 of each turbine controller 202 may generally include memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 210 may generally be configured to store suitable computer-readable instructions that, when implemented by the processor(s) 208, configure each of the turbine controllers 202 to perform various computer-implemented functions, such as one or more aspects of the control logic 300 described below with reference to FIG. 4 and/or the method 400 described below with reference to FIG. 5. In addition, each turbine controller 202 may also include various other suitable components, such as a communications circuit or module, one or more input/output channels, a data/control bus and/or the like.

Furthermore, the farm-level controller 204 may comprise any suitable processor-based device known in the art, such as a computing device or any suitable combination of computing devices. Thus, in several embodiments, the farm-level controller 204 may include one or more processor(s) 212 and associated memory device(s) 214 configured to perform a variety of computer-implemented functions. Such memory device(s) 214 may generally be configured to store suitable computer-readable instructions that, when implemented by the processor(s) 212, configure the farm-level controller 204 to perform various computer-implemented functions, such as one or more aspects of the control logic 300 described below with reference to FIG. 4 and/or the method 400 described below with reference to FIG. 5. In addition, the farm-level controller 204 may also include various other suitable components, such as a communications circuit or module, one or more input/output channels, a data/control bus and/or the like.

Additionally, the system 200 may include one or more power sensors 216. In general, the power sensor(s) 216 is configured to capture data indicative of the amount of electric power being output by the wind farm 100. In one embodiment, a single power sensor 216 may be in operative communication with the transmission line(s) 104 adjacent to the grid 102 to measure the power output of the wind farm 100 at that location. Alternatively, multiple power sensors 216 may be used, such as when measuring the power output of each wind turbine 10 of the wind farm 100. The power sensor(s) 216 may, in turn, be communicatively coupled to the computing system 201, thereby allowing data from the sensor(s) 216 to be transmitted to the computing system 201.

Moreover, the system 200 may include a user interface 218. More specifically, the user interface 218 may be configured to receive inputs (e.g., inputs associated with overriding the prevention of reconnecting tripped wind turbines to the grid) from the operator of the wind farm 100. As such, the user interface 218 may include one or more input devices, such as touchscreens, keypads, touchpads, knobs, buttons, sliders, switches, mice, microphones, and/or the like, which are configured to receive inputs from the operator. The user interface 218 may, in turn, be communicatively coupled to the computing system 201 via the communicative link 206 to permit the received inputs to be transmitted from the user interface 218 to the computing system 201 (e.g., to the farm-level controller 204). In addition, some embodiments of the user interface 218 may include one or more feedback devices (not shown), such as display screens, speakers, warning lights, and/or the like, which are configured to provide feedback from the computing system 201 to the operator.

Figure 4:
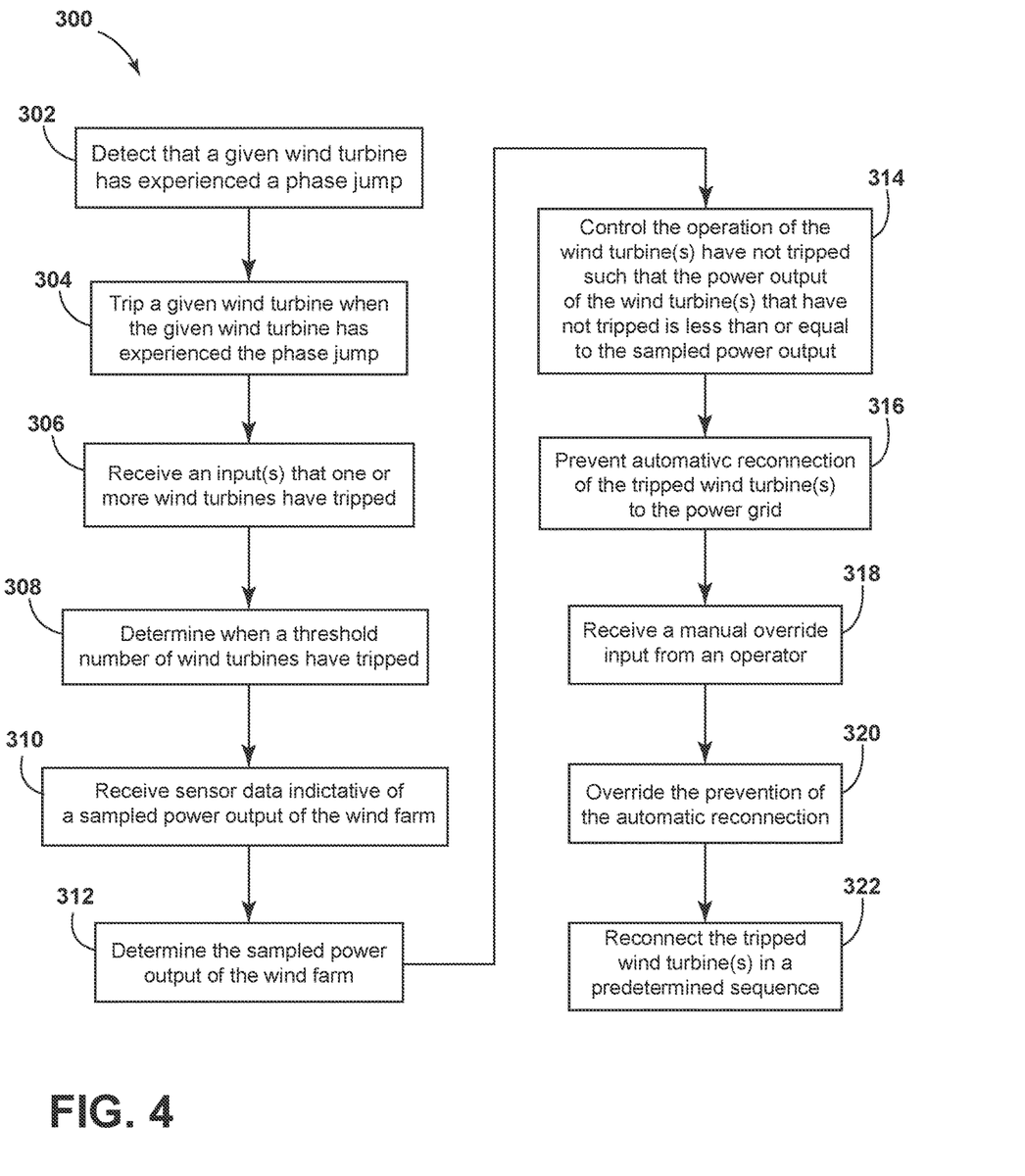
FIG. 4 is a flow diagram of one embodiment of control logic for controlling wind farm operation.

FIG. 4 is a flow diagram of one embodiment of control logic 300 that may be executed by the computing system 201 (or any other suitable computing system) for controlling wind farm operation during a weak grid condition. Specifically, the control logic 300 shown in FIG. 4 is representative of steps of one embodiment of an algorithm that can be executed to control wind farm operation to eliminate a weak grid condition. Thus, in several embodiments, the control logic 300 may allow for real-time wind farm control without requiring substantial computing resources and/or processing time. However, in other embodiments, the control logic 300 may be used in association with any other suitable system, application, and/or the like for controlling wind farm operation.

As shown in FIG. 4, at (302), the control logic 300 includes detecting that a given wind turbine of the plurality of wind turbines forming a wind farm has experienced a phase jump. Specifically, in several embodiments, the computing system 201 is configured to detect that a given wind turbine 10 of the plurality of wind turbines 10 forming the wind farm 100 has experienced a phase jump. The detected phase jump may, in turn, indicate that a weak grid condition is occurring. Thus, such tripping may be caused by or a result of a weak grid. For example, in one embodiment, the turbine controller 202 of the given wind turbine 10 may detect the phase jump, such as by using functionality of a power converter (not shown) of the given wind turbine 10. However, in alternative embodiments, the computing system 201 may detect a phase jump in the given wind turbine 10 in any other suitable manner.

Furthermore, at (304), the control logic 300 includes tripping the given wind turbine when the given wind turbine has experienced the phase jump. Specifically, in several embodiments, when a phase jump is detected at (302), the computing system 201 is configured to trip the given wind turbine 10. Tripping the given wind turbine 10 disconnects the given wind turbine 10 from grid 102 such that the given wind turbine 10 is unable to supply electric power to the grid 102. In this respect, and as will be described below, tripping a wind turbine reduces the power supplied to the grid 102, which may eliminate a weak grid condition that is occurring. For example, in one embodiment, the turbine controller 202 of the given wind turbine 10 may control the operation of one or more components of the given wind turbine 10 (e.g., a breaker) to disconnect the given wind turbine 10 from grid 102.

(302) and (304) are described in the context of a single given wind turbine 10 of the wind farm 100. However, (302) and (304) may be repeated for any wind turbine 10 of the wind farm 100 that experiences a phase jump. For example, when several wind turbines 10 experience phase jump simultaneously, these wind turbine may similarly be simultaneously tripped.

Additionally, at (306), the control logic 300 includes receiving one or more inputs indicating that one or more wind turbines of a plurality of wind turbines forming a wind farm have tripped. Specifically, in several embodiments, the computing system 201 is configured to receive one or more inputs indicating that one or more wind turbines 10 of the wind farm 100 have tripped or otherwise been disconnected to the grid 102. For example, as mentioned above, in some embodiments, the farm-level controller 204 is communicatively coupled to each turbine controller 202. In such embodiments, the farm-level controller 204 may receive an input(s) from the turbine controller(s) 202 of the wind turbines 10 that have tripped at (304).

Moreover, at (308), the control logic 300 includes determining when a threshold number of the plurality of wind turbines have tripped based on the received one or more inputs. Specifically, in several embodiments, the computing system 201 is configured to determine when a threshold number of wind turbines 10 have tripped based on the received input(s). For example, in some embodiments, upon receipt of the input(s) from the turbine controller(s) 202 at (306), the farm-level controller 204 may determine the number of wind turbines 10 in the wind farm 100 that have tripped. Thereafter, the farm-level controller 204 may compare the number of tripped wind turbines 10 to a threshold value to determine when a threshold number of the plurality of wind turbines have tripped. The threshold value may be any suitable number, such as three, five, ten, twelve, fifteen, twenty, etc., that is selected to indicate that the wind farm 100 is experiencing a weak grid configuration.

In addition, at (310), the control logic 300 includes receiving sensor data indicative of a sampled power output of the wind farm. Specifically, as described above, in several embodiments, the computing system 201 is communicatively coupled to the power sensor(s) 216 via the communicative link 206. In this respect, during operation of the wind farm 100, the computing system 201 (e.g., the farm-level controller 204 of the computing system 201) is configured to receive data from the power sensor(s) 216 indicative of a sampled power output of the wind farm 100. That is, such received sensor data is indicative of the collective amount of electric power being generated by the wind turbines 10 of the wind farm 100 that have not tripped.

Furthermore, at (312), after it is determined that the threshold number of the plurality of wind turbines have tripped, the control logic 300 includes determining the sampled power output of the wind farm based on the received sensor data. Specifically, in several embodiments, after it is determined that the threshold number of the plurality of wind turbines have tripped at (308), the computing system 201 is configured to determine the sampled power output of the wind farm 100 based on the sensor data received at (310). The sampled power output determined at (312) is the power output of the wind farm 100 (i.e., of the wind turbines 10 that have not tripped) after the threshold number of wind turbines 10 have tripped.

Additionally, at (314), after it is determined that the threshold number of the plurality of wind turbines have tripped, the control logic 300 includes control the operation of the one or more wind turbines of the plurality of wind turbines that have not tripped such that the power output of the one or more wind turbines of the plurality of wind turbines that have not tripped is less than or equal to the sampled power output. Specifically, in several embodiments, after it is determined that the threshold number of the plurality of wind turbines have tripped at (308), the computing system 201 is configured to control the operation of the wind turbine(s) 10 of the wind farm 100 that have not tripped such that the power output of the wind turbine(s) that have not tripped and, thus, the wind farm 100 is less than or equal to the sampled power output determined at (312). For example, in one embodiment, the farm-level controller 204 may transmit control signals to the non-tripped wind turbines 10 via the communicative link 206. The control signals may, in turn, instruct the turbine controller(s) 202 of the non-tripped wind turbine(s) 10 to control the operation of the non-tripped wind turbine(s) 10 such that their power output is less than or equal to the sampled power output. In this respect, by maintaining the power output of the non-tripped wind turbines 10 at a reduced level (i.e., the sampled power output) after a threshold number of the wind turbines 10 have tripped, the weak grid condition can be at least temporarily eliminated.

In some embodiments, at (314), after it is determined that the threshold number of the plurality of wind turbines have tripped, the control logic 300 includes controlling the operation of the one or more wind turbines of the plurality of wind turbines that have not tripped such that the power output of the one or more wind turbines of the plurality of wind turbines that have not tripped is greater than a minimum threshold power output. Specifically, in several embodiments, after it is determined that the threshold number of the plurality of wind turbines have tripped at (308), the computing system 201 is configured to control the operation of the wind turbine(s) 10 of the wind farm 100 that have not tripped such that the power output of the wind turbine(s) that have not tripped and, thus, the wind farm 100 is greater than a minimum threshold power output (e.g., 25 MW for a 100 MW wind farm). This, in tur, prevents to power output of the wind farm 100 from falling too low.

Moreover, at (316), after it is determined that the threshold number of the plurality of wind turbines have tripped, the control logic 300 includes preventing automatic reconnection of the one or more wind turbines of the plurality of wind turbines that have tripped to a power grid. Specifically, in several embodiments, the computing system 201 (e.g., the farm-level controller 204 of the computing system 201) is configured to prevent automatic reconnection of the wind turbine(s) 10 that have tripped to the power grid 102. This prevents the weak grid condition from reappearing when one of the tripped wind turbines 10 is the cause of the weak grid condition.

In addition, at (318), after automatic reconnection is prevented, the control logic 300 includes receiving a manual override input from an operator. More specifically, when automatic reconnection is being prevented at (316), an operator(s) of the wind farm 100 may determine the cause of the weak grid condition resulting in the tripping of a threshold number of wind turbines 10. For example, the cause may be within the wind farm 100, such as with one or more of the wind turbines 10. In such instances, the operator(s) may address these issues. Conversely, the cause may be a transient condition external to power grid. Once the cause of the weak grid condition has been corrected or has disappeared (e.g., a transient condition), the operator(s) may provide manual override input to the user interface 218. The manual override input may, in turn, be transmitted from the user interface 218 to the computing system 201 (e.g., the farm-level controller 204 of the computing system 201).

Furthermore, at (320), the control logic 300 includes overriding the prevention of the automatic reconnection and allowing the one or more wind turbines of the plurality of wind turbines that have tripped to reconnect to the power grid upon receipt of the manual override input. Specifically, in several embodiments, upon receipt of the manual override input at (318), the computing system 201 (e.g., the farm-level controller 204 of the computing system 201) is configured to override the prevention of the automatic reconnection and allow the tripped wind turbine(s) 10 to reconnect to the power grid 102.

Additionally, at (322), the control logic 300 includes reconnecting the one or more wind turbines of the plurality of wind turbines that have tripped to the power grid in a predetermined sequence. Specifically, in several embodiments, the computing system 201 (e.g., the farm-level controller 204 of the computing system 201) is configured to instruct the tripped wind turbines 10 to reconnect to the power grid 102 in a predetermined sequence (e.g., by transmitting appropriate control signals to the corresponding turbine controller(s) 202). The predetermined sequence may be set to maximize the rate at which the wind farm 100 ramps up its active power output.

Figure 5:
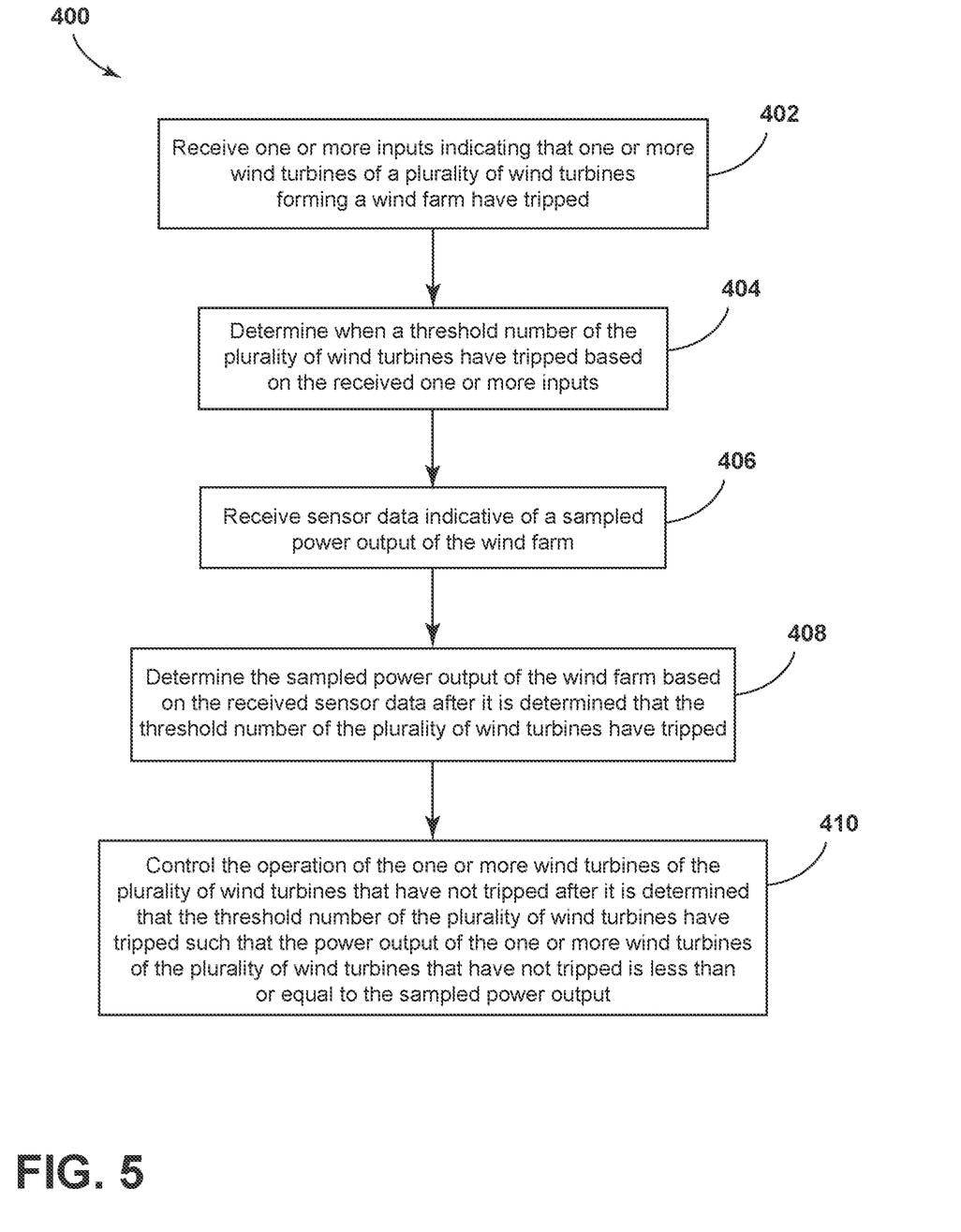
FIG. 5 is a flow diagram of one embodiment of a method for controlling wind farm operation.

FIG. 5 is a flow diagram of one embodiment of a method 400 for controlling wind farm operation during a weak grid condition. In general, the method 400 will be described herein with reference to the wind turbine 10, the wind farm 100 and the system 200 described above with reference to FIGS. 1-6. However, the disclosed method 400 may generally be implemented with any wind turbine having any suitable configuration, with any wind farm having any suitable configuration and/or within any system having any suitable system configuration. In addition, although FIG. 5 depicts steps performed in a particular order for purposes of illustration and discussion, the methods discussed herein are not limited to any particular order or arrangement. As such, various steps of the methods disclosed herein can be omitted, rearranged, combined, and/or adapted in various ways without deviating from the scope of the present disclosure.

As shown in FIG. 5, at (402), the method 400 includes receiving, with a computing system, one or more inputs indicating that one or more wind turbines of a plurality of wind turbines forming a wind farm have tripped. For example, in several embodiments, the computing system 201 (e.g., the farm-level controller 204) may receive one or more inputs indicating that one or more wind turbines 10 of the plurality of wind turbines 10 forming a wind farm 100 have tripped.

Furthermore, at (404), the method 400 includes determining, with the computing system, when a threshold number of the plurality of wind turbines have tripped based on the received one or more inputs. For example, in several embodiments, the computing system 201 (e.g., the farm-level controller 204) may determine when a threshold number of the plurality of wind turbines 10 have tripped based on the received one or more inputs.

Additionally, at (406), the method 400 includes receiving, with the computing system, sensor data indicative of a sampled power output of the wind farm. For example, in several embodiments, the computing system 201 (e.g., the farm-level controller 204) may receive sensor data from the power sensor(s) 216 indicative of a sampled power output of the wind farm 100.

Moreover, at (408), after it is determined that the threshold number of the plurality of wind turbines have tripped, the method 400 includes determining, with the computing system, the sampled power output of the wind farm based on the received sensor data. For example, in several embodiments, after it is determined that the threshold number of the plurality of wind turbines have tripped, the computing system 201 (e.g., the farm-level controller 204) may determine the sampled power output of the wind farm 100 based on the received sensor data.

In addition, at (410), after it is determined that the threshold number of the plurality of wind turbines have tripped, the method 400 includes controlling, with the computing system, an operation of the one or more wind turbines of the plurality of wind turbines that have not tripped such that the power output of the one or more wind turbines of the plurality of wind turbines that have not tripped is less than or equal to the sampled power output. For example, in several embodiments, after it is determined that the threshold number of the plurality of wind turbines have tripped, the computing system 201 (e.g., the farm-level controller 204) may control the operation of the one or more wind turbines 10 of the plurality of wind turbines 10 that have not tripped such that the power output of the one or more wind turbines 10 of the plurality of wind turbines 10 that have not tripped is less than or equal to the sampled power output.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for controlling wind farm operation during a weak grid condition, the method comprising:
receiving, with a computing system, one or more inputs indicating that one or more wind turbines of a plurality of wind turbines forming a wind farm have tripped;
determining, with the computing system, when a threshold number of the plurality of wind turbines have tripped based on the received one or more inputs;
receiving, with the computing system, sensor data indicative of a sampled power output of the wind farm;
determining, with the computing system, the sampled power output of the wind farm based on the received sensor data when it is determined that the threshold number of the plurality of wind turbines have tripped; and,
controlling, with the computing system, an operation of the one or more wind turbines of the plurality of wind turbines that have not tripped when it is determined that the threshold number of the plurality of wind turbines have tripped such that the power output of the one or more wind turbines of the plurality of wind turbines that have not tripped is less than the sampled power output.

2. The method of claim 1, further comprising:
preventing, with the computing system, automatic reconnection of the one or more wind turbines of the plurality of wind turbines that have tripped to a power grid after it is determined that the threshold number of the plurality of wind turbines have tripped.

3. The method of claim 2, further comprising:
receiving, with the computing system, a manual override input from an operator after preventing automatic reconnection; and,
overriding, with the computing system, the prevention of the automatic reconnection and allowing the one or more wind turbines of the plurality of wind turbines that have tripped to reconnect to the power grid upon receipt of the manual override input.

4. The method of claim 3, further comprising:
reconnecting, with the computing system, the one or more wind turbines of the plurality of wind turbines that have tripped to the power grid in a predetermined sequence.

5. The method of claim 1, controlling the operation of the one or more wind turbines of the plurality of wind turbines that have not tripped comprises controlling, with the computing system, the operation of the one or more wind turbines of the plurality of wind turbines that have not tripped after it is determined that the threshold number of the plurality of wind turbines have tripped such that the power output of the one or more wind turbines of the plurality of wind turbines that have not tripped is greater than a minimum threshold power output.

6. The method of claim 1, wherein the tripping of the one or more wind turbines of the plurality of wind turbines that have tripped is due to a weak grid condition.

7. The method of claim 6, further comprising:
detecting, with the computing system, that a given wind turbine of the plurality of wind turbines has experienced a phase jump; and,
tripping, with the computing system, the given wind turbine when the given wind turbine has experienced the phase jump.

8. A system for controlling wind farm operation during a weak grid condition, the system comprising:
a plurality of wind turbines forming a wind farm;
one or more sensors configured to capture data indicative of a power output of the wind farm; and,
a computing system communicatively coupled to the one or more sensors, the computing system configured to:
receive one or more inputs indicating that one or more wind turbines of the plurality of wind turbines have tripped;
determine when a threshold number of the plurality of wind turbines have tripped based on the received one or more inputs;
determine a sampled power output of the wind farm based on the data captured by the one or more sensors when it is determined that the threshold number of the plurality of wind turbines have tripped; and,
control the operation of the one or more wind turbines of the plurality of wind turbines that have not tripped when it is determined that the threshold number of the plurality of wind turbines have tripped such that the power output of the one or more wind turbines of the plurality of wind turbines that have not tripped is less than the sampled power output.

9. The system of claim 8, wherein the computing system is further configured to:
prevent automatic reconnection of the one or more wind turbines of the plurality of wind turbines that have tripped to a power grid after it is determined that the threshold number of the plurality of wind turbines have tripped.

10. The system of claim 9, wherein the computing system is further configured to:
receive a manual override input from an operator after preventing automatic reconnection; and,
override the prevention of the automatic reconnection and allow the one or more wind turbines of the plurality of wind turbines that have tripped to reconnect to the power grid upon receipt of the manual override input.

11. The system of claim 10, wherein the computing system is further configured to:
reconnect the one or more wind turbines of the plurality of wind turbines that have tripped to the power grid in a predetermined sequence.

12. The system of claim 8, wherein, when controlling the operation of the one or more wind turbines of the plurality of wind turbines that have not tripped, the computing system is configured to control the operation of the one or more wind turbines of the plurality of wind turbines that have not tripped after it is determined that the threshold number of the plurality of wind turbines have tripped such that the power output of the one or more wind turbines of the plurality of wind turbines that have not tripped is greater than a minimum threshold power output.

13. The system of claim 8, wherein the tripping of the one or more wind turbines of the plurality of wind turbines that have tripped is due to a weak grid condition.

14. The system of claim 13, wherein the computing system is further configured to:
detect that a given wind turbine of the plurality of wind turbines has experienced a phase jump; and,
trip the given wind turbine when the given wind turbine has experienced the phase jump.

15. The system of claim 8, wherein the computing system comprises a farm-level controller and a plurality of turbine controllers, each turbine controller of the plurality of turbine controller being installed within one wind turbine of the plurality of wind turbines.

16. A wind farm, comprising:
   a plurality of wind turbines, each wind turbine of the plurality of wind turbines including a tower, a nacelle mounted atop the tower, and a rotor having rotatable hub with at least one rotor blade mounted thereto;
   one or more sensors configured to capture data indicative of a power output of the wind farm; and,
   a computing system communicatively coupled to the one or more sensors, the computing system including a farm-level controller and a plurality of turbine controllers, each turbine controller of the plurality of turbine controllers being installed within one wind turbine of the plurality of wind turbines, the computing system configured to:
   receive one or more inputs indicating that one or more wind turbines of the plurality of wind turbines have tripped;
   determine when a threshold number of the plurality of wind turbines have tripped based on the received one or more inputs;
   determine a sampled power output of the wind farm based on the data captured by the one or more sensors when it is determined that the threshold number of the plurality of wind turbines have tripped; and,
   control the operation of the one or more wind turbines of the plurality of wind turbines that have not tripped when it is determined that the threshold number of the plurality of wind turbines have tripped such that the power output of the one or more wind turbines of the plurality of wind turbines that have not tripped is less than the sampled power output.

17. The wind farm of claim 16, wherein the computing system is further configured to:
   prevent automatic reconnection of the one or more wind turbines of the plurality of wind turbines that have tripped to a power grid after it is determined that the threshold number of the plurality of wind turbines have tripped.

18. The wind farm of claim 17, wherein the computing system is further configured to:
   receive a manual override input from an operator after preventing automatic reconnection; and
   override the prevention of the automatic reconnection and allow the one or more wind turbines of the plurality of wind turbines that have tripped to reconnect to the power grid upon receipt of the manual override input.

19. The wind farm of claim 18, wherein the computing system is further configured to:
   reconnect the one or more wind turbines of the plurality of wind turbines that have tripped to the power grid in a predetermined sequence.

20. The wind farm of claim 16, wherein, when controlling the operation of the one or more wind turbines of the plurality of wind turbines that have not tripped, the computing system is configured to control the operation of the one or more wind turbines of the plurality of wind turbines that have not tripped after it is determined that the threshold number of the plurality of wind turbines have tripped such that the power output of the one or more wind turbines of the plurality of wind turbines that have not tripped is greater than a minimum threshold power output.

* * * * *